(12) United States Patent
Fish, Jr. et al.

(10) Patent No.: US 7,696,301 B2
(45) Date of Patent: Apr. 13, 2010

(54) MARINE UMBILICAL COMPRISING HYDROLYSIS RESISTANT POLYAMIDES

(75) Inventors: Robert B. Fish, Jr., Parkersburg, WV (US); Marvin M. Martens, Vienna, WV (US); Steven A. Mestemacher, Parkersburg, WV (US); Rolando Umali Pagilagan, Parkersburg, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 42 days.

(21) Appl. No.: 11/258,285

(22) Filed: Oct. 25, 2005

(65) Prior Publication Data

US 2006/0112997 A1 Jun. 1, 2006

Related U.S. Application Data

(60) Provisional application No. 60/622,403, filed on Oct. 27, 2004.

(51) Int. Cl.
*C08G 69/14* (2006.01)
(52) U.S. Cl. ............ 528/324; 428/36.91; 528/310
(58) Field of Classification Search ............ 428/36.91; 528/310, 324
See application file for complete search history.

(56) References Cited

U.S. PATENT DOCUMENTS

| 4,076,664 | A | * | 2/1978 | Pagilagan | ............ 528/339.3 |
| 6,191,207 | B1 | | 2/2001 | Fujii et al. | |
| 6,538,198 | B1 | | 3/2003 | Wooters | |
| 2004/0118468 | A1 | * | 6/2004 | Mestemacher | ............ 138/137 |
| 2005/0181162 | A1 | * | 8/2005 | Mestemacher et al. | ..... 428/36.9 |

* cited by examiner

*Primary Examiner*—James Seidleck
*Assistant Examiner*—Gregory Listvoyb

(57) ABSTRACT

Marine umbilicals are provided comprising polyamide compositions having good hydrolysis resistance and that may optionally contain plasticizer.

7 Claims, 1 Drawing Sheet

MARINE UMBILICAL COMPRISING HYDROLYSIS RESISTANT POLYAMIDES

CROSS REFERENCE TO RELATED APPLICATIONS

This application claims the benefit of U.S. Provisional Application No. 60/622,403, filed Oct. 27, 2004.

FIELD OF THE INVENTION

The present invention relates to marine umbilicals comprising hydrolysis resistant polyamide compositions that may optionally comprise plasticizer.

BACKGROUND OF THE INVENTION

Marine umbilicals are used to transport materials and information between a control or processing facility such as a platform, surface vessel, or land-based installation, and an undersea oil wellhead. The umbilicals comprise a plurality of inner tubes encased in an outer casing. The inner tubes may independently convey materials such as hydraulic fluids, organic solvents such as methanol, corrosion inhibitors, hot water, etc. from the surface to the wellhead. The solvents and hot water may be used to remove asphaltines, waxes, tars, and other contaminants accumulated on the walls of well pipes. Other inner tubes may provide a conduit for communication cables such electrical and electronic cables or fiber optic cables.

Umbilicals often comprise internal steel tubes encased in an outer polymeric pipe, where the steel tubes are used to convey chemicals such as hydraulic fluids, organic solvents, hot water, and the like. Although steel can be resistant to the chemicals and any elevated pressures used, it can have the disadvantages of high cost, high weight, and poor flexibility and fatigue strength. Flexibility and fatigue strength are particularly important in applications where the umbilical is subjected to stresses caused by ocean currents, waves, transportation, and the like.

Because they have good chemical resistance, good physical properties, light weight, and can be conveniently formed into tubular structures with a variety of cross sections and incorporated into multilayered structures, polyamides are often a desirable material to use for pipes and tubes. However, many marine umbilical applications require that the inner tubes be exposed to nucleophiles such as water and alcohols at elevated temperatures. Under such conditions, the amide bonds of many polyamides may be susceptible to hydrolysis and the rate of hydrolysis increases with temperature. Hydrolysis of the amide bonds can cause a reduction in molecular weight and concomitant loss in physical properties that can result in failure of the pipe during use. Such a failure can be catastrophic, with the loss of fluid causing undesirable consequences ranging from the impairment of the performance of other components present in the umbilical, to contact of the fluid with the external environment if the outer pipe fails.

Aliphatic polyamides such as polyamide 6,12 or polyamide 11 are frequently used to make pipes and tubing, but many applications require greater hydrolysis resistance than can be obtained from currently available polyamides.

It would be desirable to obtain a marine umbilical inner tube component comprising a polyamide composition that has both improved hydrolysis resistance and can be conveniently plasticized to give it the flexibility needed to be useful in many applications. U.S. Pat. No. 6,538,198, which is hereby incorporated by reference herein, discloses a marine umbilical including tubes having an inner polymer sleeve and an outer sleeve of carbon fibers in an epoxy matrix positioned around the inner sleeve.

SUMMARY OF THE INVENTION

There is disclosed and claimed herein marine umbilicals comprising at least one polyamide inner tube and an outer casing surrounding the least one polyamide inner tube, wherein the at least one polyamide inner tube comprises a polyamide composition comprising a polyamide comprising:

(a) about 2 to about 35 mole percent of repeat units derived from at least one aromatic dicarboxylic acid having 4 to 16 carbon atoms and/or at least one alicyclic dicarboxylic acid having 8 to 20 carbon atoms and at least one aliphatic diamine having 4 to 20 carbon atoms and/or at least one alicyclic diamine having 6 to 20 carbon atoms; and (b) about 65 to about 98 mole percent of repeat units derived from at least one aliphatic dicarboxylic acid having 6 to 36 carbon atoms and at least one aliphatic diamine having 4 to 20 carbon atoms and/or at least one alicyclic diamine having 6 to 20 carbon atoms, and/or repeat units derived from at least one lactam having 4 to 20 carbon atoms and/or aminocarboxylic acid having 4 to 20 carbon atoms.

The polyamide composition may optionally further comprise plasticizer.

DETAILED DESCRIPTION OF THE INVENTION

There are a number of terms used throughout the specification for which the following will be of assistance in understanding their scope and meaning. As used herein and as will be understood by those skilled in the art, the terms "terephthalic acid", "isophthalic acid", and "dicarboxylic acid/dioic acid" refer also to the corresponding carboxylic acid derivatives of these materials, which can include carboxylic acid esters, diesters, and acid chlorides. Moreover and as used herein, and as will be understood by one skilled in the art, the term "hydrolysis resistant" in conjunction with a polyamide refers to the ability of the polyamide to retain its molecular weight upon exposure to water.

Figure 1:
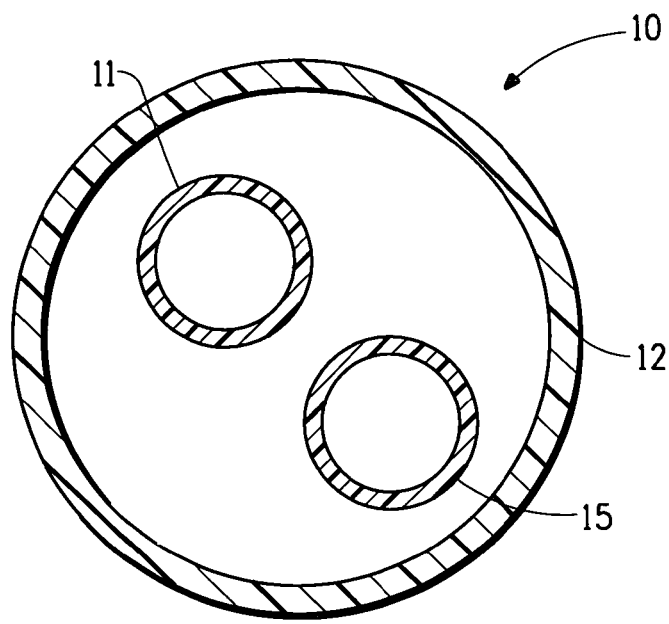
FIG. 1 is a cross-sectional view of an exemplary umbilical of the present invention.
Figure 2:
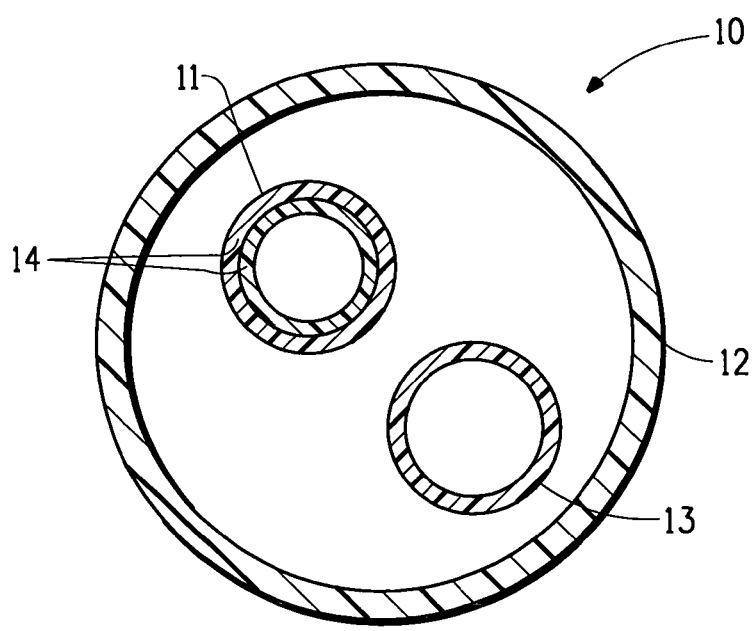
FIG. 2 is a cross-sectional view of an exemplary umbilical of the present invention.

As is illustrated in FIGS. 1 and 2, the marine umbilical 10 of the present invention comprises one or more inner tubes 11 comprising the polyamide composition described in detail below, wherein inner tubes 11 are surrounded by an outer casing 12. The inner tube 11 may comprise a single layer 13 or multiple concentric layers 14. When multiple layers are present, at least one layer comprises the polyamide composition described below, while layers may comprise other polymeric materials, metals, or other materials. The marine umbilical 10 may optionally further comprise additional inner tubes 15 separately comprising other materials, including other polymeric materials and metals such as steel. Other polymeric materials may include polyamides such as polyamide 11; polyamide 12; polyamide 6,12; and polyamide 6,10 or other polymeric materials such as polyethylene or polypropylene. The additional inner tubes 15 may be single layered or multilayered. Outer casing 12 may be made from any suitable material. Preferred materials include thermoplasticelastomers. Inner tubes 11, optionally 15, and casing 12 may be in physical contact with one another or there may be spaces present between one or more of them.

Tubes 11 and 15 and casing 12 may have a circular or roughly circular (e.g. oval) cross-section. However more generally they may be shaped into seemingly limitless geometries so long as they define a passageway therethrough. For example suitable shapes may include polygonal shapes and may even incorporate more that one shape along the length thereof. Tubes 11 and 15 and casing 12 may have a variety of wall thicknesses and (in the event that they are circular in cross section) diameters.

The inner tube 11 of the umbilical of the present invention comprises a polyamide composition comprising a polyamide comprising about 2 to about 35 mole percent, or preferably about 4 to about 20 mole percent, or more preferably about 5 to about 11 mole percent of repeat units (a) derived from at least one aromatic dicarboxylic acid having 4 to 16 carbon atoms and/or at least one alicyclic dicarboxylic acid having 8 to 20 carbon atoms and at least one aliphatic diamine having 4 to 20 carbon atoms and/or at least one alicyclic diamine having 6 to 20 carbon atoms. The polyamide comprises about 65 to about 98 mole percent, or preferably about 80 to about 96 mole percent, or more preferably about 89 to about 95 mole percent of repeat units (b) derived from at least one aliphatic diamine having 4 to 20 carbon atoms and/or at least one alicyclic diamine having 6 to 20 carbon atoms and at least one aliphatic dicarboxylic acid having 6 to 36 carbon atoms and/or repeat units derived from at least one lactam and/or aminocarboxylic acid having 4 to 20 carbon atoms.

By "aromatic dicarboxylic acid" is meant dicarboxylic acids in which each carboxyl group is directly bonded to an aromatic ring. Examples of suitable aromatic dicarboxylic acids include terephthalic acid; isophthalic acid; 1,5-nathphalenedicarboxylic acid; 2,6-nathphalenedicarboxylic acid; and 2,7-nathphalenedicarboxylic acid. Terephthalic acid and isophthalic acid are preferred. By "alicyclic dicarboxylic acid" is meant dicarboxylic acids in which each carboxyl group is directly bonded to a saturated hydrocarbon ring. An example of a suitable alicyclic dicarboxylic acids includes 1,4-cyclohexanedicarboylic acid. By "alicyclic diamine" is meant diamines possessing two primary or secondary amine groups and containing at least one saturated hydrocarbon ring. Alicyclic diamines preferably contain at least one cyclohexane moiety. Examples of suitable alicyclic diamines include 1-amino-3-aminomethyl-3,5,5,trimethylcyclohexane; 1,4-bis(aminomethyl)cyclohexane; and bis(p-aminocyclohexyl)methane. Any of the stereoisomers of the alicyclic diamines may be used.

Examples of aliphatic dicarboxylic acids having 6 to 36 carbon atoms include adipic acid, nonanedioic acid, decanedioic acid (also known as sebacic acid), undecanedioic acid, dodecanedioic acid, tridecanedioic acid, and tetradecanedioic acid. The aliphatic diamines having 4 to 20 carbon atoms may be linear or branched. Examples of preferred diamines include hexamethylenediamine, 2-methylpentamethylenediamine; 1,8-diaminooctane; methyl-1,8-diaminooctane; 1,9-diaminononane; 1,10-diaminodecane; and 1,12-diaminedodecane. Examples of lactams include caprolactam and laurolactam. An example of an aminocarboxylic acid includes aminodecanoic acid.

Preferred polyamides are semiaromatic polyamides. The polyamides preferably comprise repeat units (a) that are derived from terephthalic acid and/or isophthalic acid and hexamethylenediamine and repeats units (b) that are derived from at least one of nonanedioic acid and hexamethylenediamine; decanedioic acid and hexamethylenediamine; undecanedioic acid and hexamethylenediamine; dodecanedioic acid and hexamethylenediamine; tridecanedioic acid and hexamethylenediamine; tetradecanedioic acid and hexamethylenediamine; caprolactam; laurolactam; and 11-aminoundecanoic acid.

A preferred polyamide comprises from about 3 to about 40 mole percent of repeat units derived from terephthalic acid and hexamethylenediamine and complementally from about 60 to about 97 mole percent of repeat units derived from dodecanedioic acid and hexamethylenediamine. Another preferred polyamide comprises from about 3 to about 40 mole percent of repeat units derived terephthalic acid and hexamethylenediamine and complementally from about 60 to about 97 mole percent of repeat units derived from decanedioic acid and hexamethylenediamine.

The polyamide used in the present invention may be prepared by any means known to those skilled in the art, such as in a batch process using, for example, an autoclave or using a continuous process. See, for example, Kohan, M. I. Ed. *Nylon Plastics Handbook*, Hanser: Munich, 1995; pp. 13-32. Additives such as lubricants, antifoaming agents, and end-capping agents may be added to the polymerization mixture.

The polyamide composition used in the present invention may optionally comprise additives. A preferred additive is at least one plasticizer. The plasticizer will preferably be miscible with the polyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesufonamides, such as N-butylbenzenesulfonamide, N-(2-hydroxypropyl)benzenesulfonamide, N-ethyl-otoluenesulfonamide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide.

The plasticizer may be incorporated into the composition by melt-blending the polymer with plasticizer and, optionally, other ingredients, or during polymerization. If the plasticizer is incorporated during polymerization, the polyamide monomers are blended with one or more plasticizers prior to starting the polymerization cycle and the blend is introduced to the polymerization reactor. Alternatively, the plasticizer can be added to the reactor during the polymerization cycle.

When used, the plasticizer will be present in the composition in about 1 to about 20 weight percent, or more preferably in about 6 to about 18 weight percent, or yet more preferably in about 8 to about 15 weight percent, wherein the weight percentages are based on the total weight of the composition.

The polyamide composition used in the present invention may optionally comprise additional additives such as impact modifiers; thermal, oxidative, and/or light stabilizers; colorants; lubricants; mold release agents; and the like. Such additives can be added in conventional amounts according to the desired properties of the resulting material, and the control of these amounts versus the desired properties is within the knowledge of the skilled artisan.

When present, additives may be incorporated into the polyamide composition used in the present invention by melt-blending using any known methods. The component materials may be mixed to homogeneity using a melt-mixer such as a single or twin-screw extruder, blender, kneader, Banbury mixer, etc. to give a polyamide composition. Or, part of the materials may be mixed in a melt-mixer, and the rest of the materials may then be added and further melt-mixed until homogeneous.

The inner tube 11 of the present invention may be formed by any method known to those skilled in the art, such as extrusion. When tube 11 comprises multiple layers, the polyamide composition used in the present invention may be extruded over one or more additional layers, including polymeric and metal layers. Alternatively, additional layers may be added to a tube comprising at least one layer comprising the polyamide used in the present invention by any method known in the art, such as extrusion or wrapping. The marine umbilical of the present invention is formed by any suitable method known in the art.

EXAMPLES

Determination of Hydrolysis Resistance

It is well known in the art that when hydrolyzed, polyamides often lose physical properties. The loss of physical properties is often directly correlated with a decrease in inherent viscosity of the polyamide. The degree of degradation may be conveniently studied by observing the decrease of a polyamide's inherent viscosity over time. Such a method is described in API (American Petroleum Institute) Technical Report 17TR2, June 2003, and is the method upon which the following procedure is based.

Hydrolysis resistance testing was done on compositions molded into standard ISO tensile bars that were immersed in distilled water in a pressure vessel. The water and samples were held under vacuum for 30 minutes and then high-purity argon was bubbled through the water for 30 minutes to remove dissolved oxygen. The vessel was then sealed and placed in a conventional electrical heating mantle. The temperature in the vessel was controlled by use of a thermocouple in a thermowell in the wall of the vessel and was maintained at 105±1° C. and samples were withdrawn at intervals and their inherent viscosities and plasticizer contents were measured. After each sample was withdrawn, the water was replaced, a new sample was added, and the procedure repeated.

Inherent viscosity (IV) was measured by dissolving a sample of the polymer in m-cresol and measuring the IV in a capillary viscometer following ASTM 2857. Because plasticizer present in the samples could leach out during the hydrolysis testing and hence affect the measured IV, it was necessary to correct for the amount of plasticizer present in each sample.

In order to correct for the amount of plasticizer in each sample, the weight percent plasticizer content was measured by heating samples under vacuum and measuring the weight loss that occurred during heating. The inherent viscosity corrected for plasticizer content (CIV) was calculated by formula (1) (where plasticizer % is the weight percentage plasticizer present in the sample):

$$CIV = \frac{IV}{(100\% - \text{plasticizer \%})} * 100\% \quad (1)$$

The percent loss of CIV was calculated by formula (2):

$$\%CIV \text{ loss} = \frac{CIV(t=x)}{CIV(t=0)} * 100\% \quad (2)$$

where $CIV_{(t=x)}$ is the CIV for the sample taken at time x and $CIV_{(t=0)}$ is the CIV for a sample taken before hydrolysis testing.

The % CIV loss was plotted as a function of $\log_{10}$(time), where time is the amount of time in hours each sample was exposed to water in the pressure vessel at 105±1° C. A linear least squares fit was made to the plot of % CIV loss as a function of $\log_{10}$(time) and a value for % CIV loss at 500 hours was calculated by interpolation from the least squares fit. The results are reported below.

Comparative Example 1

A polyamide 6,12 salt solution having a pH of about 8.0 and was prepared by dissolving hexamethylenediamine and 1,12-dodecanedioic acid in water. The concentration of salt in the solution was 45 percent by weight. The salt solution (5,700 lbs) was charged to a vessel. A conventional antifoaming agent (250 g of a 10 percent by weight aqueous solution), phosphoric acid (about 0.18 lbs of a 78 percent weight aqueous solution), and N-butylbenzenesulfonamide (490 lbs) were added to the vessel. The resulting solution was then concentrated to 80 weight percent while heating under pressure. The solution was then charged to an autoclave and heated. The pressure was allowed to rise to 265 psia. Heating was continued until the temperature of the reaction reached 255° C., during which time steam was vented to maintain the pressure at 265 psia The pressure was then reduced slowly to 14.7 psia while the reaction temperature was allowed to rise to 280° C. The pressure was held at 14.7 psia and the temperature at 280° C. for 30 minutes. The resulting polymer melt was extruded into strands, cooled, and cut into pellets that were dried at 160° C. under nitrogen. The resulting polymer is referred to hereafter as "C1."

C1 (98.4 weight percent) was dry blended by tumbling in a drum with the stabilizers Tinuvin® 234 (0.5 weight percent), Irgafos® 168 (0.4 weight percent); Irganox® 1098 (0.4 weight percent); Chimassorb® 944F (0.3 weight percent). Each stabilizer is available from Ciba Specialty Chemicals, Tarrytown, N.Y. The resulting blend was then molded into standard ISO tensile bars. The bars were subjected to hydrolysis testing as described above and the results are shown in Table 1. The % CIV loss at 500 hours was calculated to be 39.8% using the method described above.

TABLE 1

| Sample | Exposure time (h) | Plasticizer content (wt. %) | Measured IV | CIV | CIV loss (%) |
|---|---|---|---|---|---|
| 1 | 0 | 10.3 | 1.55 | 1.73 | 0 |
| 2 | 20 | 7.6 | 1.548 | 1.68 | 3.0 |
| 3 | 76 | 6.7 | 1.472 | 1.58 | 8.9 |
| 4 | 238 | 3.6 | 1.158 | 1.20 | 30.5 |
| 5 | 832 | 1.4 | 0.931 | 0.94 | 45.4 |
| 6 | 1153 | 0.8 | 0.878 | 0.89 | 48.8 |
| 7 | 1153 | 0.8 | 0.877 | 0.88 | 48.8 |

Example 1

A polyamide 6,12 salt solution having a pH of about 7.7 was prepared by dissolving hexamethylenediamine and 1,12- dodecanedioic acid in water. The solution had a concentration of about 44.6 weight percent. A polyamide 6, T salt solution having a pH of about 8 was prepared by dissolving hexamethylenediamine and terephthalic acid in water. The 6,T salt solution had a concentration of about 40 weight percent. Both solutions were charged into an autoclave. A conventional antifoaming agent (10 g of a 10 percent by weight aqueous solution), sodium hypophosphite (0.014 g), and N-butylbenzenesulfonamide (51.1 g) were added to the autoclave. The resulting solution was then concentrated to 80 weight percent while heating under pressure. The concentrated solution was then heated and the pressure allowed to rise to 240 psia. Heating was continued until the temperature of the reaction reached 241° C., during which time steam was vented to maintain the pressure at 240 psia. The pressure was then slowly reduced to 14.7 psia while the reaction temperature was allowed to rise to 270° C. The pressure was held at 14.7 psia and the temperature at 280° C. for 60 minutes. The resulting polymer melt was extruded into a strand, cooled, and cut into pellets. The resulting polymer is referred to hereafter as "E1."

E1 (98.4 weight percent) was dry blended by tumbling in a drum with the stabilizers Tinuvin® 234 (0.5 weight percent), Irgafos® 168 (0.4 weight percent); Irganox® 1098 (0.4 weight percent); Chimassorb® 944F (0.3 weight percent). Each stabilizer is available from Ciba Specialty Chemicals, Tarrytown, N.Y. The resulting blend was then molded into standard ISO tensile bars. The bars were subjected to hydrolysis testing as described above and the results are shown in Table 2. The % CIV loss at 500 hours was calculated to be 29.8% using the method described above.

TABLE 2

| Sample | Exposure time (h) | Plasticizer content (wt. %) | Measured IV | CIV | CIV loss (%) |
|---|---|---|---|---|---|
| 1 | 0 | 5.9 | 1.056 | 1.12 | 0 |
| 2 | 18 | 3.1 | 0.973 | 1.00 | 10.5 |
| 3 | 127 | 1.6 | 0.822 | 0.84 | 25.6 |
| 4 | 361.5 | 1.3 | 0.787 | 0.80 | 28.9 |
| 5 | 839 | 0.3 | 0.781 | 0.78 | 30.2 |

A comparison of the results of Example 1, wherein the composition comprises a polyamide comprising repeat units derived from hexamethylenediamine and terephthalic acid and hexamethylenediamine and 1,12-dodecanedioic acid, with those of Comparative Example 1, wherein the composition comprises a polyamide comprising only repeat units derived from hexamethylenediamine and 1,12-dodecanedioic acid, demonstrates that incorporation of repeat units derived from hexamethylenediamine and terephthalic acid leads to a substantial decrease in % CIV loss, and hence improvement in hydrolysis resistance.

What is claimed is:

1. A marine umbilical comprising at least one polyamide inner tube and an outer casing surrounding the least one polyamide inner tube, wherein the at least one polyamide inner tube consists essentially of a copolyamide composition comprising a copolyamide consisting essentially of:
   (a) about 5 to about 11 mole percent of repeat units derived from terephthalic acid and hexamethylenediamine and
   (b) from about 89 to about 95 mole percent of repeat units derived from dodecanedioic acid and hexamethylenediamine or decanedioic acid and hexamethylenediamine.

2. The umbilical of claim 1 wherein repeat units (b) are derived from decanedioic acid and hexamethylenediamine.

3. The umbilical of claim 1 wherein repeat units (b) are derived from dodecanedioic acid and hexamethylenediamine.

4. The umbilical of claim 1 wherein the polyamide composition further comprises about 1 to about 20 weight percent of a plasticizer.

5. The umbilical of claim 4 wherein the plasticizer is a sulfonamide.

6. The umbilical of claim 4 wherein the plasticizer is one or more of N-butylbenzenesulfonamide, N-(2-hydroxypropyl) benzenesulfonamide, N-ethyl-o-toluenesulfonamide, N-ethyl-p-toluenesulfonamide, o-toluenesulfonamide, and p-toluenesulfonamide.

7. The umbilical of claim 1 wherein the polyamide composition further comprises one or more of thermal oxidative, and/or light stabilizers; mold release agents; colorants; and lubricants.

* * * * *